United States Patent Office 3,135,708
Patented June 2, 1964

3,135,708
POLYURETHANE PLASTICS AND PREPARATION OF SAME
Erwin A. Müller, Leverkusen, and Wilhelm Becker, Cologne-Stammheim, Germany, assignors to Farbenfabriken Bayer Aktiengesellschaft, Leverkusen, Germany, a corporation of Germany
No Drawing. Filed Apr. 18, 1961, Ser. No. 103,742
Claims priority, application Germany Apr. 20, 1960
12 Claims. (Cl. 260—2.5)

This invention relates to polyurethane plastics and more particularly, to porous or nonporous polyurethane plastics, coatings, coating compositions, moldings, castings and the like.

The preparation of polyurethane plastics as well as the excellent physical properties thereof is well known. However, they are not always sufficiently resistant to hydrolysis, especially to aqueous alkaline solutions and they are often sensitive to oxidizing agents especially when they are prepared from polyether base polyhydroxyl compounds. It has been proposed heretofore in U.S. Patent 2,877,212 to react dihydroxy polybutadiene with organic polyisocyanates to prepare polyurethane plastics. However, these compounds have secondary hydroxyl groups and are not only very sluggish when reacted with organic polyisocyanates but are also frequently not at all reactive with the —NCO groups for steric reasons.

It has also been proposed heretofore in U.S. Patent 2,968,647 to react thioglycollic acid with a polymer oil such as polybutadiene in a minor amount leaving sufficient unsaturation for curing the polymer oil and producing a product which contains free carboxyl groups. Only a small amount of thioglycollic acid may be used. Any substantial addition of thioglycollic acid yields a product which is unsatisfactory for the production of polyurethane coating compositions because of the evolution of large amounts of carbon dioxide on reaction with the polyisocyanate. Moreover, the product does not contain any hydroxyl groups and the resulting product contains carbonamide groups and no urethane groups. The carboxylic acid groups when reacted with the —NCO groups produce carbonamide linkages. No urethane linkages are present in this product. The carbonamide linkages are not as stable as urethane linkages.

It is, therefore, an object of this invention to provide polyurethane plastics which are substantially devoid of the foregoing disadvantages. Another object of this invention is to provide polyurethane plastics based on polyhydroxyl compounds which contain primary hydroxyl groups and which have improved resistance to hydrolysis especially with respect to aqueous alkaline solutions. Still another object of this invention is to provide polyurethane plastics which are resistant to oxidation. Another object of this invention is to provide polyurethane plastics which contain sulfur ether atoms and which do not have disadvantageous odor. A further object of this invention is to provide polyurethane plastics based on polyhydroxyl compounds which have essentially the same molecular weight but a different content of hydroxyl. Still a further object of this invention is to provide cellular polyurethane plastics which have improved resistance to alkalies. Another object of this invention is to provide coating compositions and processes for the preparation thereof which have improved resistance to alkalies and oxidation. Another object of this invention is to provide an improved process for the preparation of coating compositions based on polyunsaturated compounds.

The foregoing objects and others which will become apparent from the following description are accomplished in accordance with the invention, generally speaking, by providing polyurethane plastics and a process for the preparation thereof which comprises reacting an organic polyisocyanate with a polyhydroxyl compound having free hydroxyl groups as essentially the sole groups thereof reactive with an —NCO group, said polyhydroxyl compound having been obtained by a process which comprises reacting an organic compound having a molecular weight of at least about 150 and containing at least one ethylenically unsaturated double bond with a mercaptan having at least one free primary hydroxyl group provided, of course, that the ethylenically unsaturated compound contain more than one double bond if there is only one hydroxyl group on the mercaptan and on the other hand that the mercaptan contain more than one hydroxyl group if there is only one ethylenically unsaturated double bond. This is necessary so that the polyhydroxyl compound will have more than one free hydroxyl group available for reaction with the organic polyisocyanate. The invention contemplates the preparation of polyurethane plastics generally, including cellular polyurethane plastics and noncellular polyurethane plastics, but the method of the invention finds its greatest utility in the preparation of coating compositions, wherein an organic polyisocyanate is reacted with the polyhydroxyl compound of the invention in an inert organic solvent to produce a coating composition having improved resistance to alkalies when coated on a substrate. The polyhydroxyl compounds have primary hydroxyl groups and essentially no free carboxyl groups. Thus, they yield products on reaction with organic polyisocyanates which contain predominately urethane linkages and not carbonamide linkages. Moreover, these compounds contain sulfur ether linkages in the correct balance with the other groups to produce a practically odorless, alkali and oxidation resistant product. The polyurethane plastic obtained by the process by reacting an organic polyisocyanate with a polyhydroxyl compound having free hydroxyl groups as essentially the sole groups reactive with an —NCO group. This polyhydroxyl compound is obtained by reacting an organic compound having a molecular weight of at least about 150 and selected from the group consisting of conjugated dienes and polyesters containing ethylenic unsaturation. The organic compound used must always contain at least one ethylenic unsaturated double bond. This organic compound is then reacted with a mercaptan containing at least one free primary hydroxyl group and having up to about 7 carbon atoms.

Any suitable organic compound containing at least one ethylenically unsaturated double bond may be used for reaction with a mercaptan having at least one free hydroxyl group for the preparation of the polyhydroxyl compound. It is preferred to use organic compounds which contain at least two ethylenically unsaturated double bonds. They must have a molecular weight of at least about 150 and are preferably liquid products. Examples are polymers of conjugated dienes such as, for example, 1,3-butadiene, 2-chlorobutadiene, 2-methylbutadiene and their copolymers with one another and with vinyl compounds such as styrene and/or acrylonitrile. The manner in which the polymerization is carried out is unimportant. Polymers which contain a relatively large proportion, for example, 30 percent or more lateral vinyl groups based on the unsaturated —C=C— bonds are preferred. Commercially available liquid polybutadiene polymers which have been prepared by the aid of metal catalysts such as sodium and the like, are preferred since low molecular weight polymers which can be cast can readily be produced therefrom. A preferred compound is a liquid polybutadiene having a molecular weight of from about 150 to about 20000.

It is also possible to use organic compounds containing ethylenically unsaturated double bonds which already have free hydroxyl groups including, for example, unsaturated polyesters and polyester amides which may be prepared for example, by any known process wherein a polycarboxylic acid is condensed with a polyhydric alcohol and/or an amine or amino alcohol including such acids as adipic acid, phthalic acid, terephthalic acid, succinic acid and the like with such polyhydric alcohols preferably having from 2 to 6 hydroxyl groups as ethylene glycol, propylene glycol, butylene glycol, 1,6-hexane diol, 1,2,6-hexane triol, glycerine, trimethylol propane, pentaerythritol, sorbitol and the like. Any suitable amino alcohol which contains both free hydroxyl groups and free primary amino groups may be used, such as, for example, β-amino ethanol, -amino ethanol and the like. In the preparation of the polyester amide one may use, in addition to the polycarboxylic acid and polyhydric alcohol, a diamine such as, for example, ethylene diamine, p-amino aniline and the like so that amide groups result in the chain. Of course, some unsaturated carboxylic acid, alcohol or amine must be included in the reactants in order to provide an organic compound containing ethylenic unsaturation. Suitable unsaturated acids include, for example, maleic acid, fumaric acid and the like. Suitable unsaturated alcohols include, for example, butene diol, pentene diol and the like. Suitable unsaturated amines include, for example, butene diamine and the like. It is also possible to use an unsaturated monocarboxylic acid such as oleic acid but which may contain other functional groups such as, hydroxy carboxylic acids, for example, ricinoleic acid.

In addition to the aforementioned types of organic compounds containing ethylenic unsaturation one may use synthetic rubber, natural rubber and degraded natural rubber.

Any suitable mercaptan containing at least one free primary hydroxyl group may be used but β-mercapto ethanol is preferred. The hydroxyl group is an alcoholic hydroxyl group. Other examples of mercaptans are γ-mercapto propanol, delta-mercapto butanol, diglycollic acid monoethylene glycol ester, monothioglycerine, 1-thiosorbitol, mercapto benzyl alcohol and the like. It is preferred to use those mercaptans which contain from 2 to 6 carbon atoms.

The reaction between the mercaptan and the ethylenically unsaturated compounds can take place in emulsion or in solution with or without the addition of activators such as air, peroxides, such as hydrogen peroxide, azo catalysts such as diisobutyric acid dinitrile and the like. The addition of an activator is unnecessary when the reaction is carried out in the presence of a solvent provided the reaction is carried out at room temperature or only at slightly elevated temperature. Suitable solvents are, for example, benzene, toluene and the like. The amount of mercaptan employed will depend on the amount of unsaturation in the ethylenically unsaturated compound and the desired hydroxyl number of the product. It is preferred to use all of the existing ethylenic unsaturation in the compound so that a saturated polyhydroxyl compound is obtained. The polyhydroxyl compound preferably contains from about 2 percent to about 10 percent by weight free hydroxyl groups and most preferably has a molecular weight between about 500 and about 20,000. The resulting polyhydroxyl compound is practically odorless and in cases where odor is a problem a small amount of an alkylene oxide such as ethylene oxide can be added to improve and reduce the odor of the polyhydroxyl compound and the resulting polyurethane plastic. The polyhydroxyl compounds are soluble in most organic solvents and especially in aliphatic esters such as acetoacetic ester and the like. They are only slightly colored liquid compositions or soft plastic products which are easy to process either as a solid substance or in solution.

One advantage of the process of the invention is that the molecular weight of the polyhydroxyl compound can be maintained at practically a constant level while varying over a wide range the hydroxyl content. This can be done by reacting more or less of the ethylenically unsaturated sites with the mercaptan containing free hydroxyl groups or by varying the number of hydroxyl groups on the mercaptan.

As set forth above the polyurethane plastics of the invention may be either cellular or noncellular but are preferably coating compositions.

For the preparation of these polyurethane plastics any suitable organic polyisocyanate may be used including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-napthalene diisocyanate, furfurylidene diisocyanate or polyisocyanates in a blocked or inactive form such as the bisphenyl carbamates of 2,4- or 2,6-toluylene dissocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyante and 20 percent 2,6-diisocyanate or 4,4'-diphenylmethane diisocyanate.

Cellular polyurethane plastics are prepared by reacting the polyhydroxyl compound with an organic polyisocyanate in the presence of a blowing agent. Suitable blowing agents are, for example, water which reacts with the organic polyisocyanate to produce carbon dioxide and halohydrocarbons such as, dichlorodifluoromethane, trichlorofluoromethane and the like.

For the preparation of the cellular polyurethane plastics it is preferred to carry out the reaction in the presence of a catalyst including for example, tertiary amines, such as triethylene diamine, N-ethyl morpholine, N-methyl morpholine, diethyl ethanolamine, N-coco morpholine, 1-methyl-4-dimethyl amino ethyl piperazine, 3-methoxy N-dimethyl propyl amine, N-dimethyl-N'-methyl isopropyl propylene diamine, N,N-diethyl-3-diethyl amino propyl amine, dimethyl benzyl amine and the like or a suitable metal catalyst such as those disclosed in U.S. Patent 2,846,408 and particularly iron acetyl acetonate or tin salts of carboxylic acids such as, for example, dibutyl tin di-2-ethyl hexoate, dibutyl tin dilaurate or metal alcoholates such as, for example, stannous octoate, stannous oleate and the like. It is also preferred to use a foam stabilizer in the prepartion of the cellular polyurethane plastics together with emulsifiers, coloring agents, fillers and the like if they are desired. A particularly suitable emulsifier is, for example, sulphonated castor oil, and a particularly suitable stabilizer is a silicone oil such as polydimethyl siloxane and the like. Suitable coloring agents are, for example, carbon black and suitable fillers are vermiculite, sawdust, graphite, carborundum, fibers and the like.

Polyurethane castings may be prepared by reacting an excess of an organic polyisocyanate with the polyhydroxyl compound under substantially anhydrous conditions in a first step and then reacting the resulting isocyanato terminated prepolymer in a second step with an organic chain extending agent such as, for example, a polyhydric alcohol or polyamine having a molecular weight below about 500 and including for example, ethylene diamine, propylene diamine, 4,4'-diamino diphenylmethane, 4,4'-dihydroxy diphenyl dimethyl methane, 1,4-butane diol, 1,6-hexane diol and the like.

The preferred polyurethanes of the invention are the coating compositions wherein the organic polyisocyanate is reacted with the polyhydroxyl compound in an inert organic solvent therefor. These compositions may be used for the production of thin films, for coatings, for adhesives, for impregnating compounds and the like particularly for the coating of leather, paper and textiles. The coating compositions are applied to any suitable substrate and a durable film is formed after the solvent has evaporated particularly where a compound having free hydroxyl groups is prepared in the organic solvent. Suitable inert organic solvents include, for example, xylene, toluene, ethylene glycol monoethyl ether acetate, benzene, acetoacetic ester and the like. It is preferred to prepare the coating composition from an adduct of a trihydroxy compound and an aromatic diisocyanate such as, for example, the reaction product of three mols of a mixture of 80 percent 2,4- and 20 percent 2,6-toluylene diisocyanate with one mol of trimethylol propane. Also, the reaction product of a toluylene diisocyanate with a phenol may be used to prepare a stoving lacquer which will split off isocyanate at a temperature above about 120° C. and yield a film having good mechanical strength, high chemical and thermal stability, good electrical properties, high gloss and exceptionally good resistance to alkali and oxidation. The well known dyes, plasticizers, flow agents and the like may be used in the coating compositions.

It is understood that the polyhydroxy compounds of this invention may be mixed with heretofore known polyhydric polyalkylene ethers, such as polypropylene glycol having a molecular weight of about 2000, polyhydric polythioethers such as the self-condensation product of thiodiglycol having a molecular weight of about 2000, and hydroxyl polyesters prepared from saturated components as set forth above and the like.

The products of this invention are useful where polyurethane plastics have been used heretofore and, particularly for the production of cushions, insulation, coatings for leather, for example, patent leather, paper, textiles, for water proofing and the like. Molded compositions may also be prepared such as gear wheels and the like.

The invention is further illustrated by the following examples in which the parts are by weight unless otherwise indicated.

*Example 1*

About 54 parts of liquid polybutadine having a molecular weight of about 13000 are dissolved in about 80 parts by volume of benzene. About 20 parts of β-mercapto ethanol are then added and the mixture is stirred at room temperature for about 72 hours. The benzene is then distilled off and the substance which remains is dried under high vacuum. About 78 parts of a viscous, practically odorless substance are obtained. The product dissolves in ethyl acetate and pyridine (about 5.2 percent —OH, acid number about 2.1, about 10.3 percent sulfur, specific viscosity about 0.138).

About 65 parts of approximately a 50 percent solution of the polyhydroxy compound thus produced in ethyl acetate are thoroughly mixed with about 50 parts of approximately a 45 percent solution of a reaction product of about 3 mols of 80 percent 2,4- and 20 percent 2,6-toluylene diisocyanate and about 1 mol of trimethylol propane in methyl glycol acetate. The clear solution is applied to supports such as glass, wood or metal, whereby a firmly adhering very glossy lacquer coating is formed after drying for a short time at about 20° C. The coating shows remarkable resistance to solvents and aqueous alkalies. The drying time of the film is greatly reduced by raising the temperature.

*Example 2*

About 54 parts of liquid polybutadiene having a molecular weight of about 13000 are dissolved in about 80 parts by volume of benzene. About 20 parts of β-mercapto ethanol and about 0.5 part of azo-diisobutyronitrile are then added and the mixture is stirred at room temperature for about 72 hours. The benzene is then evaporated off and the remaining substance is dried under high vacuum. The yield is about 71 parts of a practically odorless, viscous substance, which dissolves in ethyl acetate to form a clear solution and in acetone to form a cloudy solution (about 6 percent —OH, acid number about 1.2, sulfur content about 11.8 percent, specific viscosity about 0.126).

About 57 parts of approximately a 50 percent solution of the polyhydroxy compound thus prepared in ethyl acetate are mixed with about 50 parts of the isocyanate solution employed in Example 1. The resulting lacquer solution is applied to a copper conductor, and stoved for a short time at about 180° C. to about 200° C., whereby an elastic coating is formed which possesses good electrical properties and smoothness.

*Example 3*

About 54 parts of liquid polybutadiene having a molecular weight of about 13000 are dissolved in about 80 parts by volume of benzene. About 16 parts of β-mercapto ethanol are then added and the mixture is stirred at room temperature for about 24 hours. The benezene is then evaporated off and the substance is dried under high vacuum. The yield is about 78 parts of a viscous, practically odorless substance, which dissolves in ethyl acetate and pyridine (about 4.2 percent —OH, acid number about 1.5, sulfur content about 7.8 percent, specific viscosity about 0.168).

About 338 parts of the reaction product of about 3 mols of 80 percent 2,4- and 20 percent 2,6-toluylene diisocyanate and about 1 mol of trimethylol propane, the isocyanato groups of which are blocked by about 3 mols of phenol, are dissolved in a mixture of about 200 parts of methyl glycol acetate, about 100 parts of toluene and about 38 parts of cresol.

About 800 parts of approximately a 50 percent ethyl acetate solution of the polyhydroxy compound are added to this solution.

The lacquer solution can be kept for an unlimited period at room temperature. Highly glossy coatings which have good surface properties and good mechanical and electrical properties are obtained by applying the lacquer solution to copper wire and stoving at a temperature above about 200° C. for a short period.

If only about 12 parts of β-mercapto ethanol are used instead of 16 parts thereof for the production of the polyhydroxy compound, a polyhydroxy compound is obtained which has about 3.5 percent —OH, an acid number of about 1.6, a sulfur content of about 6.5 percent and a specific viscosity of about 0.181.

This polyhydroxy compound can be reacted in the same manner in combination with organic polyisocyanates or substances capable of splitting off organic polyisocyanates to form cross-linked lacquer coatings of high molecular weight.

*Example 4*

About 890 parts of liquid polybutadiene having a molecular weight of about 13000 are dissolved in about 1320 parts by volume of benzene. About 115 parts of β-mercapto ethanol are then added and the mixture is stirred at room temperature for about 31 hours. The benzene is then evaporated off and the substance is dried under high vacuum. About 960 parts by volume of a viscous substance are obtained. The product is soluble in toluene and ethyl acetate (about 3.5 percent —OH, acid number about 0, sulfur content about 4.4 percent). Approximately 100 parts of the polyhydroxy compound thus prepared, heated to about 40° C. to about 50° C., about 44 parts of toluylene diisocyanate mixture containing the 2,4- and 2,6-isomers in the ratio 65:35, about 1.4 parts of 1-ethoxy-3-dimethylaminopropane, about 1.5 parts of water and about 2.0 parts of approximately a 50 percent aqueous solution of sodium castor oil sulphate, are mixed together by stirring and poured into molds. After about 8 minutes, there is obtained a coarse-pored, nonshrinking, semi-rigid foam material with good resistance to alkalies. The foam material showed no change after being acted upon with approximately 10 percent sodium hydroxide solution at about 90° C. for about 8 hours.

*Example 5*

About 100 parts of the polyhydroxy compound prepared as described in Example 4 and heated to about 40° C., about 45 parts of the toluylene diisocyanate employed in Example 4, about 1.5 parts of 1-ethoxy-3-dimethylaminopropane, about 1.5 parts of approximately a 50 percent aqueous solution of oxyethylated hydroxydiphenyl, about 0.7 part of approximately a 50 percent aqueous solution of sodium castor oil sulphate, about 1.5 parts of water and about 12 parts of trichlorofluoromethane, are thoroughly mixed to produce a nonshrinking fine-pored, soft foam material having a density of about 50 kg./m.$^3$. The foam material thus produced is particularly resistant to alkalies.

It is to be understood that any other ethylenically unsaturated compound, mercaptan containing one free primary hydroxyl group, organic polyisocyanate, organic solvent, blowing agent, catalyst or the like could have been used in the foregoing working examples provided that the teachings of this disclosure are followed since the working examples are given only for the purpose of illustration and are not intended to limit the application.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane plastic obtained by a process which comprises reacting an organic polyisocyanate with a polyhydroxyl compound having free hydroxyl groups as essentially the sole groups reactive with an —NCO group, said polyhydroxyl compound having been obtained by a process which comprises reacting an organic compound having a molecular weight of at least about 150 and containing at least one ethylenically unsaturated double bond with a mercaptan containing at least one free primary hydroxyl group and having up to about 7 carbon atoms, said organic compound selected from the group consisting of conjugated dienes and polyesters containing ethylenic unsaturation, there being sufficient ethylenic unsaturation in said organic compound and hydroxyl groups in said mercaptan to provide more than one hydroxyl group.

2. The polyurethane plastic of claim 1 wherein said polyhydroxyl compound contains from about 2 percent by weight to about 10 percent by weight free hydroxyl groups.

3. A cellular polyurethane plastic which comprises the reaction product of an organic polyisocyanate with a polyhydroxyl compound containing from about 2 percent by weight to about 10 percent by weight free hydroxyl groups as essentially the sole groups thereof reactive with an —NCO group, said polyhydroxyl compound having been obtained by a process which comprises reacting in the presence of a blowing agent an organic compound having a molecular weight of at least about 150 and containing at least two ethylenically unsaturated double bonds with a mercaptan having at least one free primary hydroxyl group and having up to about 7 carbon atoms, said organic compound selected from the group consisting of conjugated dienes and polyesters containing ethylenic unsaturation.

4. The cellular polyurethane plastic of claim 3 wherein said blowing agent is water.

5. A process for the preparation of polyurethane plastics which comprises reacting an organic polyisocyanate with a polyhydroxyl compound having free hydroxyl groups as essentially the sole groups reactive with an —NCO group, said polyhydroxyl compound having been obtained by a process which comprises reacting an organic compound having a molecular weight of at least about 150 and containing at least one ethylenically unsaturated double bond with a mercaptan containing at least one free primary hydroxyl group and having up to about 7 carbon atoms, said organic compound selected from the group consisting of conjugated dienes and polyesters containing ethylenic unsaturation, there being sufficient ethylenic unsaturation in said organic compound and hydroxyl groups in said mercaptan to provide more than one hydroxyl group.

6. In the preparation of a coating composition by a process which comprises reacting an organic polyisocyanate with the reaction product of an ethylenically unsaturated organic compound and a mercaptan, the improvement which comprises reacting an organic compound having a molecular weight of at least about 150 and containing at least two ethylenically unsaturated double bonds with a mercaptan containing at least one free primary hydroxyl group until a polyhydroxyl compound containing from about 2 percent by weight to about 10 percent by weight free hydroxyl groups as essentially the sole groups thereof reactive with an —NCO group is obtained and mixing the resulting product with an organic polyisocyanate in an inert organic solvent therefor and said mercaptan having up to about 7 carbon atoms, said organic compound selected from the group consisting of conjugated dienes and polyesters containing ethylenic unsaturation.

7. A method of coating substrates which comprises applying an inert organic solvent solution of a mixture of an organic polyisocyanate and an excess of a polyhydroxyl compound containing from about 2 percent by weight to about 10 percent by weight free hydroxyl groups as the sole groups thereof reactive with an —NCO group and having a molecular weight of from about 500 to about 20,000 which is prepared from liquid polybutadiene having a molecular weight of from about 150 to about 20000 and a mercaptan containing at least one free primary hydroxyl group and having from 2 to 6 carbon atoms and heating the coated substrate to a temperature of at least about 120° C. until a solid, alkali-resistant polyurethane coating is obtained.

8. A polyurethane plastic obtained by a process which comprises reacting an organic polyisocyanate with a polyhydroxyl compound having free hydroxyl groups as essentially the sole groups reactive with an —NCO group, said polyhydroxyl compound having been obtained by a process which comprises reacting a liquid organic compound having a molecular weight of from about 150 to about 20000 and containing at least two ethylenically unsaturated double bonds with a mercaptan containing at least one free primary alcoholic hydroxyl group, said mercaptan having up to about 7 carbon atoms, said organic compound selected from the group consisting of conjugated dienes and polyesters containing ethylenic unsaturation, there being sufficient ethylenic unsaturation in said organic compound and hydroxyl groups in said mercaptan to provide more than one hydroxyl group.

9. A coating composition which comprises an inert organic solvent solution of an organic polyisocyanate and a polyhydroxyl compound having been obtained by a process which comprises reacting an organic compound having a molecular weight of at least about 150 and containing at least two ethylenically unsaturated double bonds with a mercaptan having at least one free primary hydroxyl group and having up to about 7 carbon atoms, said organic compound selected from the group consisting of conjugated dienes and polyesters containing ethylenic unsaturation, said polyhydroxyl compound containing from about 2 percent by weight to about 10 percent by weight free hydroxyl groups as essentially the sole groups thereof reactive with an —NCO group.

10. A coating composition which comprises an inert organic solvent solution of an organic polyisocyanate comprising the reaction product of about 3 mols of toluylene diisocyanate with about 1 mol of a monomeric trihydric alcohol and the reaction product of liquid polybutadiene having a molecular weight of from about 150 to about 20,000 and a mercaptan containing at least one free primary hydroxyl group and having from about 2 to 6 carbon atoms and containing from about 2 percent by weight to about 10 percent by weight free hydroxyl groups as essentially the sole groups thereof reactive with an —NCO group and having a molecular weight of from about 500 to about 10,000.

11. The coating composition of claim 9 wherein an excess of said polyhydroxyl compound is used.

12. The coating composition of claim 9 wherein said polybutadiene contains up to about 30 percent by weight of lateral vinyl groups.

References Cited in the file of this patent

UNITED STATES PATENTS

| | | |
|---|---|---|
| 2,683,162 | Gleason | July 6, 1954 |
| 2,877,212 | Seligmann | Mar. 10, 1959 |
| 2,921,039 | McKay et al. | Jan. 12, 1960 |
| 2,968,647 | Koenecke et al. | Jan. 17, 1961 |